(12) United States Patent
Cheng et al.

(10) Patent No.: US 11,539,492 B2
(45) Date of Patent: Dec. 27, 2022

(54) METHOD OF DETERMINING PHYSICAL SIDELINK FEEDBACK CHANNEL RESOURCE FOR HYBRID AUTOMATIC REPEAT REQUEST FEEDBACK AND RELATED DEVICE

(71) Applicant: FG Innovation Company Limited, Tuen Mun (HK)

(72) Inventors: Yu-Hsin Cheng, Taipei (TW); Yung-Lan Tseng, Taipei (TW); Chia-Hao Yu, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 187 days.

(21) Appl. No.: 16/937,394

(22) Filed: Jul. 23, 2020

(65) Prior Publication Data
US 2021/0028910 A1    Jan. 28, 2021

Related U.S. Application Data

(60) Provisional application No. 62/877,414, filed on Jul. 23, 2019.

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1812* (2013.01); *H04L 1/1854* (2013.01); *H04W 4/46* (2018.02); *H04W 92/18* (2013.01)

(58) Field of Classification Search
CPC ... H04L 5/0055; H04L 1/1812; H04L 1/1854; H04L 1/1896; H04L 5/0064;
(Continued)

(56) References Cited

U.S. PATENT DOCUMENTS

2016/0128055 A1   5/2016 Xiong et al.
2020/0106566 A1*  4/2020 Yeo .................. H04W 28/04
(Continued)

FOREIGN PATENT DOCUMENTS

CN          109691146 A       4/2019

OTHER PUBLICATIONS

LG Electronics, Discussion on physical layer procedures for NR sidelink, 3GPP TSG RAN WG1 Meeting #97, R1-1907018, May 17, 2019(May 17, 2019) section 2.2.1.
(Continued)

*Primary Examiner* — Vinncelas Louis
(74) *Attorney, Agent, or Firm* — ScienBiziP, P.C.

(57) ABSTRACT

A method of determining one or more PSFCH resources for HARQ feedback in sidelink communication for a first UE is provided. The method receives, from a second UE, a first SCI for scheduling a first PSSCH transmission and a second SCI for scheduling a second PSSCH transmission. The method determines priorities of a first HARQ feedback corresponding to the first PSSCH transmission and a second HARQ feedback corresponding to the second PSSCH transmission according, respectively, to the first SCI and the second SCI. The method transmits a PSFCH for at least one of the first HARQ feedback and the second HARQ feedback with a higher priority according to the determined priorities to the second UE when a first PSFCH resource for the first HARQ feedback and a second PSFCH resource for the second HARQ feedback are overlapped at least in the time domain.

14 Claims, 11 Drawing Sheets

(51) Int. Cl.
*H04W 4/46* (2018.01)
*H04W 92/18* (2009.01)

(58) Field of Classification Search
CPC ... H04L 5/0094; H04L 5/0044; H04L 1/1887; H04W 4/46; H04W 92/18; H04W 28/04; H04W 72/0446
See application file for complete search history.

(56) References Cited

U.S. PATENT DOCUMENTS

2020/0205166 A1* 6/2020 Huang .............. H04W 72/0446
2021/0306824 A1* 9/2021 Li ........................ H04L 1/1887

OTHER PUBLICATIONS

LG Electronics, Status Report to TSG, 3GPP TSG RAN meeting #84, RP-190983, Jun. 6, 2019(Jun. 6, 2019) section 2.1.1.
ITL, Physical layer procedure for NR V2X, 3GPP TSG RAN WG1 #97, R1-1907414, May 17, 2019(May 17, 2019) the whole document.

* cited by examiner

METHOD OF DETERMINING PHYSICAL SIDELINK FEEDBACK CHANNEL RESOURCE FOR HYBRID AUTOMATIC REPEAT REQUEST FEEDBACK AND RELATED DEVICE

CROSS-REFERENCE TO RELATED APPLICATION(S)

The present disclosure claims the benefit of and priority to U.S. provisional Patent Application Ser. No. 62/877,414 filed on Jul. 23, 2019, entitled "Mechanism for V2X HARQ feedback," (hereinafter referred to as "the '414 provisional"). The disclosure of the '414 provisional is hereby incorporated fully by reference into the present disclosure.

FIELD

The present disclosure generally relates to wireless communications, and more particularly, to a method of determining physical sidelink feedback channel (PSFCH) resource for hybrid automatic repeat request (HARQ) feedback and a related device.

BACKGROUND

For New Radio (NR) sidelink (SL) unicast and groupcast transmissions, HARQ feedback and HARQ combining in the physical layer are supported. HARQ acknowledgement (ACK) feedback for a physical sidelink shared channel (PSSCH) is carried in sidelink feedback control information (SFCI) format(s) via PSFCH.

When SL HARQ feedback is enabled for unicast, and non-code block group (CBG) operation is configured, the receiver user equipment (UE) in sidelink (SL) communication generates HARQ ACK if it successfully decodes the corresponding transport block (TB), and generates HARQ negative acknowledgement (NACK) if it does not successfully decode the corresponding TB after decoding the associated PSCCH targeted to the receiver UE.

When SL HARQ feedback is enabled for groupcast, use of transmitting (TX)/receiving (RX) distance and/or reference symbol received power (RSRP) is supported in deciding whether to send SL HARQ feedback.

However, there is no requirement for performing HARQ feedback if two or more PSFCH resources are overlapped in time/frequency domain.

SUMMARY

The present disclosure is directed to a method of determining PSFCH resource for HARQ feedback and a related device.

According to an aspect of the present disclosure, a method of determining PSFCH resource for HARQ feedback in SL communication for a first UE is disclosed. The method comprises receiving a first sidelink control information (SCI) for scheduling a first PSSCH transmission, from a second UE, receiving a second SCI for scheduling a second PSSCH transmission, from the second UE, determining priorities of a first HARQ feedback corresponding to the first PSSCH transmission and a second HARQ feedback corresponding to the second PSSCH transmission according to the first SCI and the second SCI, and transmitting a PSFCH for at least one of the first HARQ feedback and the second HARQ feedback with a higher priority according to the determined priorities, to the second UE when a first PSFCH resource for the first HARQ feedback and a second PSFCH resource for the second HARQ feedback are at least partially overlapped in time domain.

According to another aspect of the present disclosure, a UE for determining PSFCH resource for HARQ feedback in SL communication is disclosed. The UE comprises a processor, for executing computer-executable instructions, and a non-transitory machine-readable medium, coupled to the processor, for storing the computer-executable instructions, wherein the computer-executable instructions instruct the processor to perform the method.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
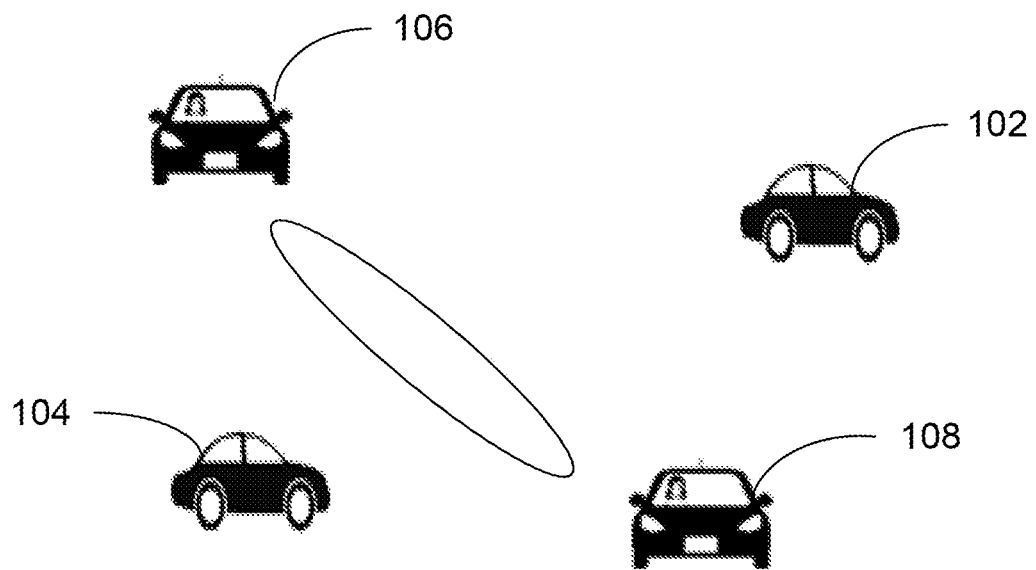
FIG. 1 is a schematic diagram illustrating a vehicle-to-everything (V2X) network, in accordance with example implementations of the present disclosure.

The following description contains specific information pertaining to exemplary implementations of the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation," and "in some implementations," may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the described combination, group, series, and equivalents.

Additionally, any two or more of the following paragraphs, (sub)-bullets, points, actions, behaviors, terms, alternatives, examples, or claims described in the following disclosure may be combined logically, reasonably, and properly to form a specific method. Any sentence, paragraph, (sub)-bullet, point, action, behaviors, terms, or claims described in the following disclosure may be implemented independently and separately to form a specific method. Dependency, e.g., "based on", "more specifically", "preferably", "In one embodiment", "In one implementation", "In one alternative" etc., in the following disclosure refers to just one possible example that would not restrict the specific method.

For explanation and non-limitation, specific details, such as functional entities, techniques, protocols, and standards are set forth for providing an understanding of the described technology. In other examples, detailed description of well-known methods, technologies, system, and architectures are omitted so as not to obscure the description with unnecessary details.

Persons skilled in the art will recognize that any described network function(s) or algorithm(s) may be implemented by hardware, software, or a combination of software and hardware. Described functions may correspond to modules that are software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of applications specific integrated circuitry (ASIC), programmable logic arrays, and/or using one or more digital signal processor (DSPs). Although some of the disclosed implementations are directed to software installed and executing on computer hardware, alternative implementations as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc (CD) read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, an LTE-A Pro system, or an New Radio (NR) system typically includes at least one base station (BS), at least one UE, and one or more optional network elements that provide connection with a network. The UE communicates with the network (e.g., a core network (CN), an evolved packet core (EPC) network, an Evolved Universal Terrestrial Radio Access Network (RAN) (E-UTRAN), a Next-Generation (GN) Core (NGC), 5G CN (5GC), or an internet via a RAN established by the BS.

It should be noted that, in the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a personal digital assistant (PDA) with wireless communication capability. The UE is configured to receive and transmit signals over an air interface to one or more cells in a RAN.

A BS may include, but is not limited to, a node B (NB) as in the UMTS, an evolved node B (eNB) as in the LTE-A, a radio network controller (RNC) as in the UMTS, a BS controller (BSC) as in the Global System for Mobile communications (GSM)/GSM Enhanced Data rates for GSM Evolution (EDGE) RAN (GERAN), an Next Generation (NG)-eNB as in an Evolved Universal Terrestrial Radio Access (E-UTRA) BS in connection with the 5GC, a next generation node B (gNB) as in the 5G-RAN, and any other apparatus capable of controlling radio communication and managing radio resources within a cell. The BS may connect to serve the one or more UEs via a radio interface to the network.

A BS may be configured to provide communication services according to at least one of the following radio access technologies (RATs): Worldwide Interoperability for Microwave Access (WiMAX), GSM (often referred to as 2G), GERAN, General Packet Radio Service (GRPS), UMTS (often referred to as 3G) according to basic wideband-code division multiple access (W-CDMA), high-speed packet access (HSPA), LTE, LTE-A, evolved LTE (eLTE), New Radio (NR, often referred to as 5G), and/or LTE-A Pro. However, the scope of the present disclosure should not be limited to these protocols.

The BS is operable to provide radio coverage to a specific geographical area using a plurality of cells forming the RAN. The BS supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the downlink (DL) and optionally uplink (UL) resources to at least one UE within the cell's radio coverage for DL and optionally UL packet transmissions). The BS can communicate with one or more UEs in the radio communication system via the plurality of cells. A cell may allocate SL resources for supporting proximity service (ProSe), LTE SL service, and LTE/NR V2X services. Each cell may have overlapped coverage areas with other cells.

With reference to FIG. 1, the V2X network includes TX UE 106, RX UE 108, UE 102 and UE 104, where the TX UE 106 has established unicast V2X linkage with the RX UE 108. The TX UE 106, RX UE 108, UE 102 and UE 104 may select the same resource pool. In the following example, PSFCH resource configuration is assigned according to resource pool in system information block (SIB) signaling or contained in SL-SIB/SL-master information block (MIB)/ radio resource control (RRC)/SL-RRC, which is assigned according to bandwidth part (BWP)/anchor carrier/cell.

It is noted that PSFCH resource configuration may be applied based on resource allocation mode 1 and mode 2 of NR V2X. Resource allocation mode 1 means that BS schedules SL resource(s) to be used by a UE for SL transmission(s), and resource allocation mode 2 means that a UE determines, i.e. BS does not schedule, SL transmission resource(s) within SL resources configured by BS/network/a scheduling UE (e.g., a SL group leader) or pre-configured SL resources.

In addition, PSFCH resource configuration is resource pool specific, and may be included in SL-MIB/SIB/SL-SIB/RRC/SL-RRC (e.g., SL-RRC signaling or PC5 RRC signaling). If there is no PSFCH resource configuration on the resource pool, the UE is not required to transmit HARQ feedback in that resource pool.

The RX UE 108 may perform HARQ multiplexing when the source identifier (ID) corresponding to the PSSCHs are the same. The source ID may be contained in the scheduling sidelink control information (SCI) or may be found in the logical channel (LCH) configuration associated to the TB/data of the PSSCH. In one implementation, higher layer (e.g., the RRC layer or medium access control (MAC) layer) of the RX UE 108 may inform physical layer of the RX UE 108 whether to apply HARQ multiplexing when two or more PSFCH resources are overlapped in time/frequency domain. In other words, the PSFCH resources may be overlapped when the RX UE 108 determines or selects the same PSFCH resource (e.g., time/frequency) for transmitting two or more HARQ feedbacks.

In other implementations, the functionalities that the gNB or TX UE 106 may enable/disable HARQ multiplexing may be supported when more than two PSFCH resources are overlapped via configuration of the RRC message, MAC control element (CE) or DL control information (DCI).

Moreover, HARQ multiplexing can be used for multiplexing two or more unicast HARQ feedback with unicast HARQ feedback, multiplexing unicast HARQ feedback with groupcast HARQ feedback, and multiplexing groupcast HARQ feedback with groupcast HARQ feedback. It is noted that multiplexing HARQ feedback for PSSCH on different subchannel/anchor carrier/resource pool may be supported in the present disclosure.

Figure 2:
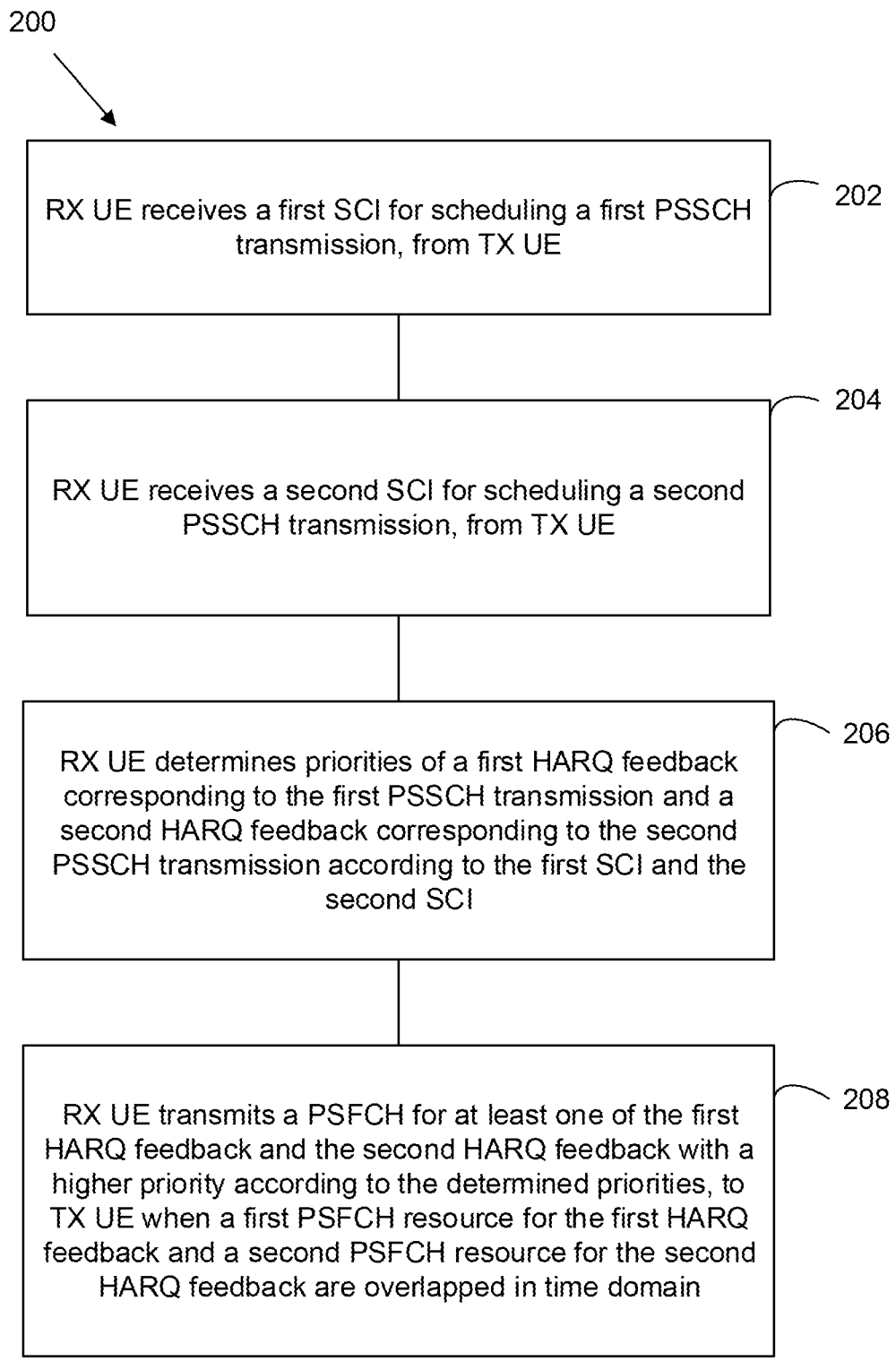
FIG. 2 is a flowchart illustrating a PSFCH resource determination, in accordance with example implementations of the present disclosure.

FIG. 2 illustrates a method 200 for V2X UEs (e.g., the RX UE 108 of FIG. 1) to perform HARQ multiplexing on PSFCH resource, so that the TX UE 106 knows whether the transmission from the TX UE 106 to the RX UE 108 is successful according to the HARQ feedback (e.g., HARQ ACK/NACK). In action 202, the RX UE 108 receives a first SCI for scheduling a first PSSCH transmission, from the TX UE 106. In action 204, the RX UE 108 receives a second SCI for scheduling a second PSSCH transmission, from the TX UE 106. In action 206, the RX UE 108 determines priorities of a first HARQ feedback corresponding to the first PSSCH transmission and a second HARQ feedback corresponding to the second PSSCH transmission according to the first SCI and the second SCI. In action 208, the RX UE 108 transmits a PSFCH for at least one of the first HARQ feedback and the second HARQ feedback with a higher priority according to the determined priorities, to the TX UE 106 when a first PSFCH resource for the first HARQ feedback and a second PSFCH resource for the second HARQ feedback are overlapped in time domain.

The method 200 achieves that the RX UE 108 performs HARQ multiplexing by first including HARQ feedback with higher priority on the PSFCH resource when two PSFCH resources respectively for a HARQ feedback are (fully or partially) overlapped in time domain (e.g., the RX UE 108 determines or selects the same PSFCH resource (e.g., time/frequency) for transmitting two or more HARQ feedbacks).

In one implementation, the RX UE 108 may multiplex and defer HARQ feedbacks (e.g., the first HARQ feedback and the second HARQ feedback) until a suitable PSFCH resource occurs. For a PSSCH transmission with its last symbol in slot n, when the corresponding HARQ feedback is generated for transmission, it is expected to be transmitted in slot n+a, where "a" is the smallest integer larger than or equal to "K" with the condition that slot n+a contains the suitable PSFCH resource, wherein "K" is an integer multiple of 4, and the suitable PSFCH resource is defined as PSFCH resource that can accommodate number of bits equal to or more than number of bits for multiplexing HARQ bits for all of the PSSCHs. In other words, if the PSFCH resource in slot n+a has sufficient size/capacity, the RX UE 108 can perform HARQ multiplexing to transmit the first HARQ feedback and second HARQ feedback to the TX UE 106. However, if the PSFCH resource in slot n+a has insufficient size/capacity, the RX UE 108 transmits one HARQ feedback with higher priority (e.g., the first HARQ feedback or the second HARQ feedback) to the TX UE 106.

In one implementation, if the first suitable PSFCH (with enough size/capacity to include all HARQ bits) after slot n+K is overlapped with a PSSCH, PSCCH or PSFCH of other resource pools, the RX UE 108 may drop PSSCH transmission/reception, PSCCH transmission/reception, or PSFCH transmission/reception on other resource pools.

In one implementation, if there are more than one PSFCH selection window, the subsequent PSFCH selection window may override the previous PSFCH selection window. To be more specific, for a first PSSCH transmission with its last symbol in slot n, when the corresponding HARQ feedback is generated, it is expected to be transmitted in slot n+a, where "a" is the smallest integer larger than or equal to "K" with the condition that slot n+a contains a suitable PSFCH resource. If there is a second PSSCH transmission with its last symbol in slot m, which is prior to slot n+a, the RX UE 108 may expect a suitable PSFCH resource for transmitting multiplexing HARQ feedback for both first and second PSSCH transmission in slot m+a. It is noted that there may be a (pre-)configured timing length (for multiplexing window) "X" with the unit of slot/subframe/symbol, and, therefore, the RX UE 108 may expect to transmit HARQ feedback before "n+X" (e.g., X starts at the slot of the first PSSCH transmission). If the PSFCH resource for the second PSSCH transmission is located in slot m+a that is after "n+X", the RX UE 108 may not expect to multiplex HARQ feedback for the first and the second PSSCH transmission (e.g., the PSFCH resource for the first PSSCH transmission is located in slot n+a, and the PSFCH for the second PSSCH transmission is located in slot m+a).

In one implementation, if there are more than one suitable PSFCH resources on the same slot, the RX UE 108 may select the one located on subchannel with lowest index (e.g., PSFCH resource starts on the lowest subchannel index). In some implementations, the RX UE 108 may select the PSFCH resource with smaller capacity for SFCI of the slot. In some implementations, the RX UE 108 may select the PSFCH resource that starts at an earlier symbol of the slot.

It is noted that whether to perform HARQ multiplexing may be configured/indicated explicitly in MIB-SL/SIB/SIB-SL/RRC/SL-RRC according to resource pool/BWP/anchor carrier. In one implementation, the RX UE 108 determines whether to perform HARQ multiplexing according to PSFCH resource configuration. To be more specific, if there is only one PSFCH format in PSFCH configuration or all the PSFCH resource in PSFCH configuration can only accommodate one HARQ bit, the RX UE 108 may consider it is unable to perform HARQ multiplexing in this resource pool/anchor carrier/BWP.

In other implementations, the RX UE 108 determines whether to perform HARQ multiplexing according to a service type of corresponding TB/data of PSSCH, where the service type can be differentiated by LCH/LCG ID of the TB/data in MAC configuration/priority indicator in the SCI of the TB/data. For example, there is a threshold and the RX UE 108 may not perform HARQ multiplexing for HARQ bits of the TB/data, if the LCH/LCG ID of the TB/data in MAC configuration/priority indicator in the SCI of the TB/data is larger than or equal to the threshold. In some implementations, a HARQ restriction list may be configured upon logical channel prioritization (LCP) such that that only certain LCG or certain LCH matching the restriction list could be allowed to perform HARQ multiplexing. In addition, the RX UE 108 may multiplex a first set of HARQ bits for certain services, multiplex another set of HARQ bits for other services, and with the first or second set fed back individually (i.e., the RX UE 108 may include another set of HARQ feedback in another HARQ codebook).

There are different implementations for HARQ multiplexing on PSFCH resource.

Figure 3:
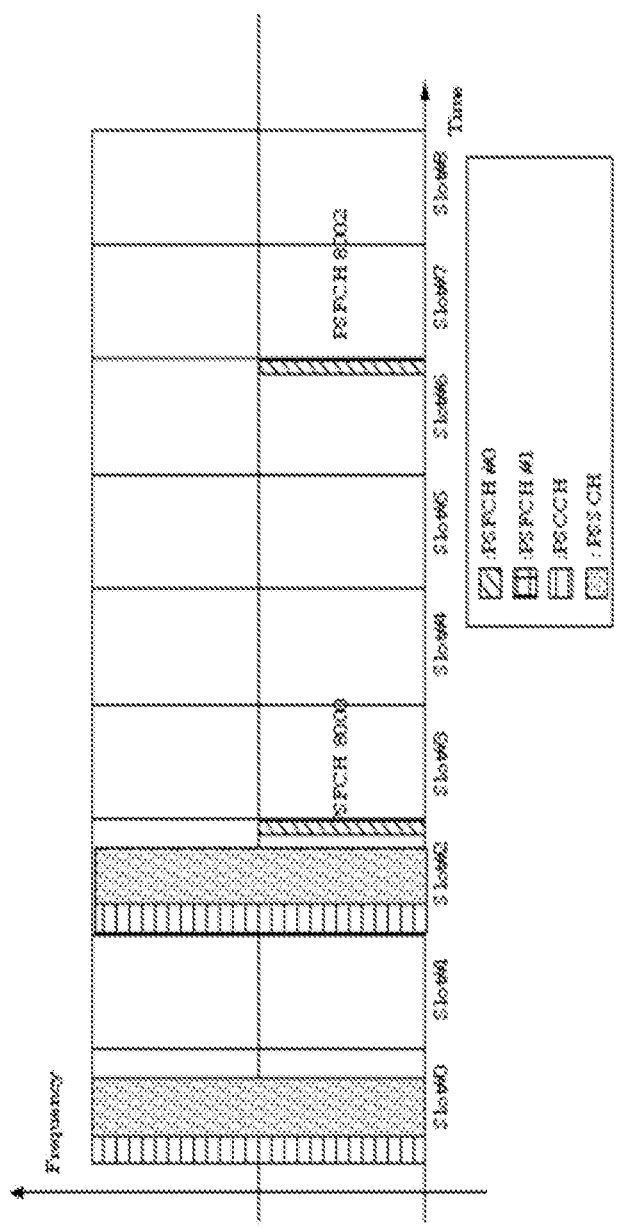
FIG. 3 is a schematic diagram illustrating PSFCH resource allocation within the resource pool, in accordance with example implementations of the present disclosure.

Implementation #1: Dropping Low Priority HARQ Feedback When Performing HARQ Multiplexing In a first action, the TX UE 106 and RX UE 108 have established unicast SL linkage. The TX UE 106 and RX UE 108 may receive SIB signaling for PSFCH resource configuration as shown in Table 1. It is noted that in this implementation, only one PSFCH resource format (e.g., PSFCH #0 as shown in FIG. 3) is configured in the resource pool.

TABLE 1

SIB singling for NR V2X

SIB signaling ::{
SL-resourcepool::{
.
.
.
- PSFCH resource configuration
  - periodicity: 4 slots
  - slot offset:2 slot
  - frequency offset: 0 (subchannel)
  - frequency domain BW: 5 subchannels
  - initial cyclic shift set: {0, 3, 6, 9}
.
.
.
}
}

In a second action, as shown in FIG. 3, the RX UE 108 receives the first PSSCH scheduled by the first SCI from the TX UE 106 in slot #0, and receives the second PSSCH scheduled by the second SCI from the TX UE 106 in slot #2. Since the first SCI and the second SCI have the same source IDs (e.g., ID of the TX UE 106), the RX UE 108 may perform HARQ multiplexing for PSSCHs scheduled by these two SCIs. Therefore, the RX UE 108 calculates cyclic shift indicating HARQ ACK/NACK for HARQ feedback of each SCI independently. The scheduling offset "K slots" between the last symbol of PSSCH to the first symbol of PSFCH is fixed as "4".

In a third action, the RX UE 108 successfully receives and decodes PSSCH transmitted in slot #0, but fails to receive and decode PSSCH transmitted in slot #2.

Since RX UE determines to transmit HARQ feedbacks on a PSFCH resource 8002 in slot #6 according to the first SCI and second SCI, the RX UE 108 may drop a portion of HARQ feedback due to insufficient size/capacity of the PSFCH resource 8002. Because the priority value in the second SCI is larger than the priority value in the first SCI, the RX UE 108 may consider the HARQ feedback for the first SCI is more important than the HARQ feedback for the second SCI, and, therefore, the RX UE 108 drops the HARQ feedback for the second SCI. Therefore, the RX UE 108 transmits HARQ ACK as HARQ feedback for the first SCI in slot #6.

In addition, the UE 102 and UE 104 may monitor the PSFCH resource 8002 in slot #6 to determine whether the retransmission resource reserved by the TX UE 106 and RX UE 108 can be released. Since the RX UE 108 transmits HARQ ACK in slot #6, the UE 102 and UE 104 may consider that the retransmission resource for the first PSSCH is released. Regarding the retransmission resource for the second PSSCH, the UE 102 and UE 104 may consider that the retransmission resource for the second PSSCH is still reserved by the TX UE 106 and RX UE 108 because the UE 102 and UE 104 fail to receive HARQ feedback for the second PSSCH.

In one implementation, low priority HARQ feedback is dropped when two or more PSFCH resources are overlapped in time/frequency domain (e.g., the RX UE 108 selects the same PSFCH resource for transmitting two or more HARQ feedback). In some implementations, the HARQ feedback with lower priority may be dropped only if the PSFCH resource does not have enough resource size to include all of the HARQ bits. That is, if there is no suitable PSFCH resource in the selected resource pool, the UE may drop a portion of HARQ bits (e.g., HARQ feedback for the second SCI scheduling the second PSSCH) according to the priority level of corresponding data/TB of PSSCH. To be more specific, HARQ bit for low priority data/TB may be dropped first if the PSFCH resource does not have enough capacity. The priority level of data/TB can be indicated by the scheduling SCI or derived from the LCH configuration of the data/TB. In some implementations, the UE may determine which HARQ bit shall be dropped according to the service type/priority/LCH information of the data/TB.

Figure 4:
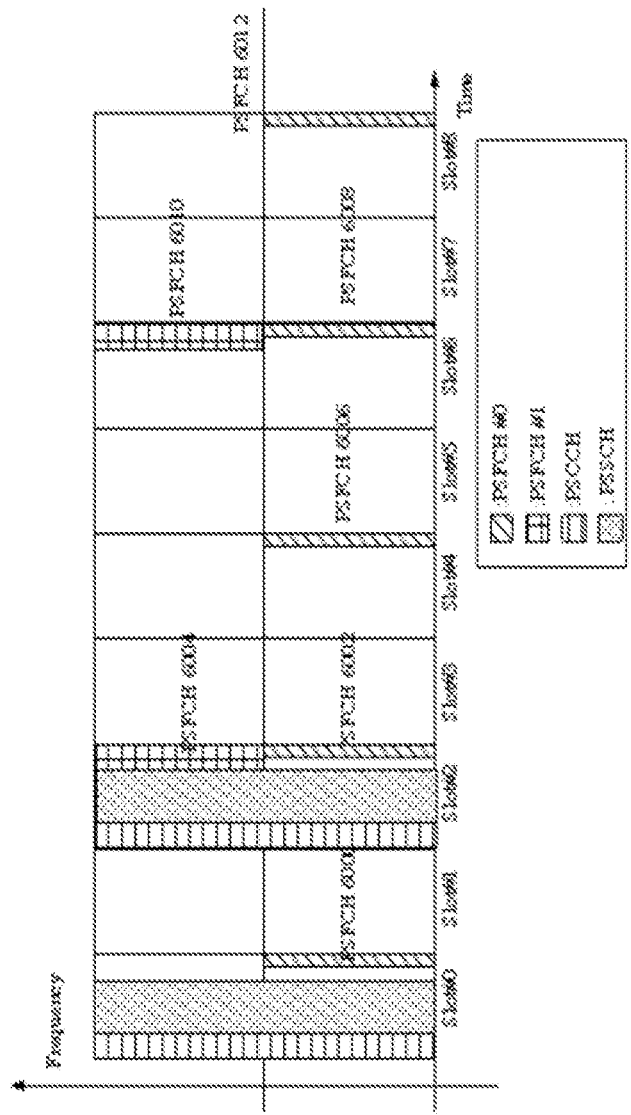
FIG. 4 is a schematic diagram illustrating PSFCH resource allocation within the resource pool, in accordance with example implementations of the present disclosure.

Implementation #2: HARQ Multiplexing With Overriding Previous PSFCH Selection Window In a first action, the TX UE 106 and RX UE 108 have established unicast SL linkage. The TX UE 106 and RX UE 108 have received SIB signaling for PSFCH resource configuration as shown in Table 2. It is noted that two PSFCH resource formats (e.g., PSFCH #0 and PSFCH #1 as shown in FIG. 4) with different HARQ feedback capacities are configured in the resource pool.

TABLE 2

SIB singling for NR V2X

SIB signaling ::{
SL-resourcepool::{
.
.
.
- PSFCH resource configuration
  - resource ID: #0
  - PSFCH format: 0

TABLE 2-continued

SIB singling for NR V2X

```
        - periodicity: 2 slots
        - slot offset:0 slot
        - frequency offset: 0 (subchannel)
        - frequency domain BW: 5 subchannels
        - number of OFDM symbol: 1 OS
        .
        .
        .
        - PSFCH resource configuration
           - resource ID: #1
           - PSFCH format: 0
           - periodicity: 4 slots
           - slot offset: 2 slots
           - frequency offset: 5 (subchannel)
           - frequency domain BW: 5 subchannels
           - number of OFDM symbol: 2 OS
        .
        .
        .
        }
}
```

In a second action, as shown in FIG. 4, the RX UE 108 receives the first PSSCH scheduled by the first SCI from the TX UE 106 in slot #0, and receives the second PSSCH scheduled by the second SCI from the TX UE 106 in slot #2. Since the first SCI and the second SCI have the same source IDs (e.g., ID of the TX UE 106), the RX UE 108 may perform HARQ multiplexing for PSSCHs scheduled by these two SCIs.

In a third action, since the RX UE 108 successfully receives and decodes PSSCH transmitted in slot #0, but fails to receive and decode PSSCH transmitted in slot #2, the RX UE 108 may transmit HARQ feedback on a PSFCH resource 6010, which is located on the first slot equal to or larger than slot 0+2+K. In other words, the PSFCH determined by the subsequent PSSCH/PSCCH will override the PSFCH determined by previous PSSCH/PSCCH when the RX UE 108 applies HARQ multiplexing for PSSCHs. It is noted that the overriding may be applied when the first PSFCH is expected to be in slot n+a and there is a second PSSCH transmission with its last symbol in slot m, which is prior to slot n+a.

In a fourth action, the UE 102 and UE 104 may monitor the PSFCH resource 6010 in slot #6 to determine whether the retransmission resource reserved by the TX UE 106 and RX UE 108 shall be released. Since the RX UE 108 transmits HARQ ACK in slot #6, the UE 102 and UE 104 may consider that the retransmission resource for the PSSCH in slot #0 is released, but the retransmission resource for the PSSCH in slot #2 is reserved.

Implementation #3: Not perform HARQ Multiplexing According to Priority of the Data/TB In a first action, the TX UE 106 and RX UE 108 have established unicast SL linkage. The TX UE 106 and RX UE 108 have received SIB signaling for PSFCH resource configuration as shown in Table 2.

Figure 5:
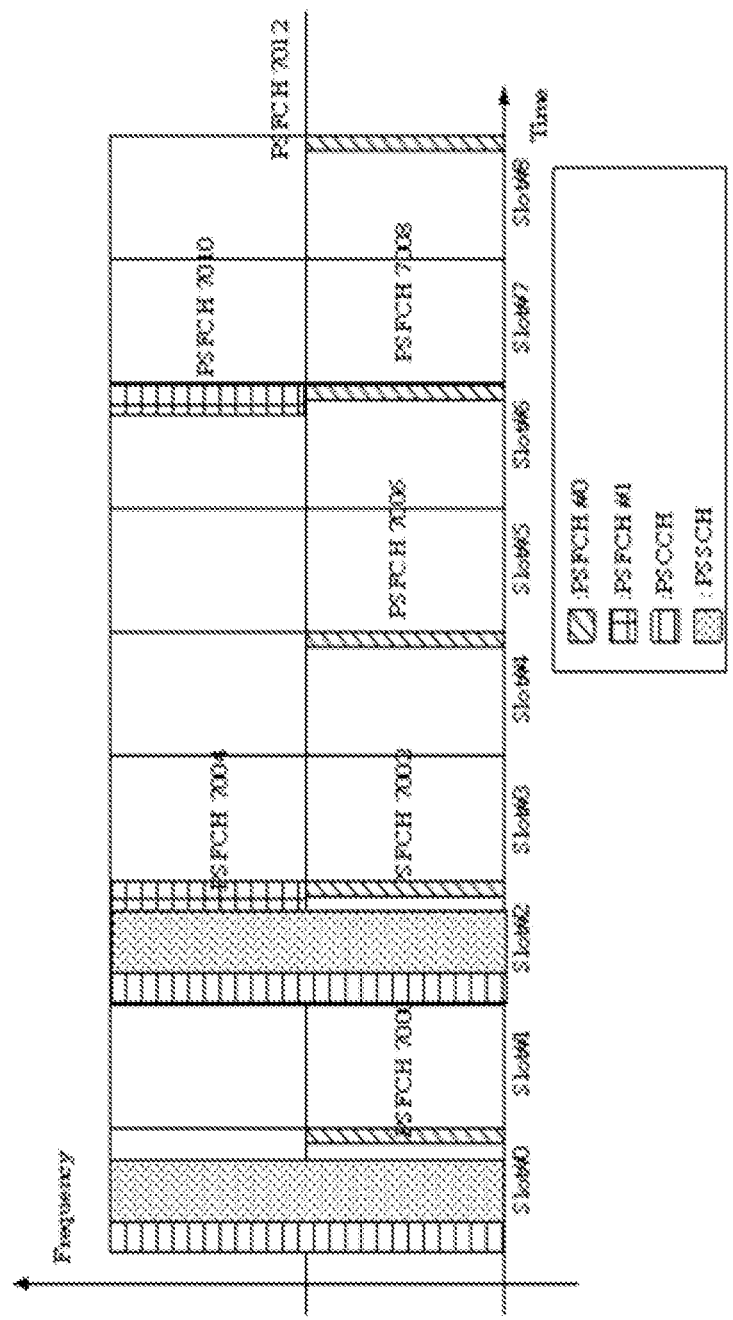
FIG. 5 is a schematic diagram illustrating PSFCH resource allocation within the resource pool, in accordance with example implementations of the present disclosure.

In a second action, as shown in FIG. 5, the RX UE 108 receives the first PSSCH scheduled by the first SCI from the TX UE 106 in slot #0, and then receives the second PSSCH scheduled by the second SCI from the TX UE 106 in slot #2. Since the first SCI and the second SCI have the same source IDs (e.g., ID of the TX UE 106), the RX UE 108 may perform HARQ multiplexing for PSSCHs scheduled by these two SCIs. However, the RX UE 108 may not perform HARQ multiplexing, but may calculate cyclic shift for HARQ feedback of each SCI independently. The scheduling offset "K slots" between the last symbol of PSSCH to the first symbol of PSFCH is fixed as "4".

In a third action, since the RX UE 108 fails to receive and decode the PSSCH transmitted in slot #0, the RX UE 108 may transmit HARQ NACK on a PSFCH resource 7006. Afterward, the RX UE 108 may successfully receive and decode PSSCH transmitted in slot #2, the RX UE 108 may transmit HARQ NACK on a PSFCH resource 7008. It is noted that in this example, the UE may select PSFCH resource with less HARQ bit capacity when more than one suitable PSFCH resource are located on the same slot.

In a fourth action, the UE 102 and UE 104 may monitor the PSFCH 7006 in slot #4 to determine whether the retransmission resource reserved by the TX UE 106 and RX UE 108 can be released. Since the RX UE 108 transmits HARQ NACK in slot #4, the UE 102 and UE 104 may consider that the retransmission resource for the first PSSCH is reserved. Then, the UE 102 and UE 104 may monitor the PSFCH resource 7008 in slot #6 to determine whether the retransmission resource for the second PSSCH reserved by the TX UE 106 and RX UE 108 can be released. Since the RX UE 108 transmits HARQ ACK in slot #6, the UE 102 and UE 104 may consider that the retransmission resource for the first PSSCH is released.

The abovementioned cyclic shift is used for determining the phase shift of sequence on PSFCH for indicating HARQ ACK/NACK, and the cyclic shift comprises at least two parts, one is initial cyclic shift and the other one is sequence cyclic shift. Mechanisms for cyclic shift determination/indication are disclosed.

Cyclic Shift is Explicitly Indicated in SL SCI

1. Cyclic shift value is indicated in SL SCI, and the range of cyclic shift value can be 0 to NSCRB (i.e., the number of subcarriers according to resource block).

2. There are one or more than one indexes in SL SCI, and each index value corresponds to a cyclic shift value. The mapping relationship between index and cyclic value is pre-defined in the technical standard documents, preconfigured in the device or contained in broadcast signaling, and the mapping relationship is configured according to anchor carrier, according to resource pool or according to BWP.

3. There are one or more than one indexes in SL SCI, and each index value corresponds to an entry of a table. The table may comprise at least PSFCH format, the first symbol of PSFCH, number of symbols for PSFCH, subchannel offset between PSSCH or PSCCH to PSFCH, and set of initial CS indexes as shown in Table 3. Table 3 may be pre-defined in the technical standard documents, preconfigured in the device, or contained in broadcast signaling, and is configured according to anchor carrier, according to resource pool, or according to BWP. In some implementations, multiple tables could be defined and UE may apply the corresponding table with entry value according to its type, mobility, or capability negotiation.

TABLE 3 mapping table for cyclic shift

| Index | PSFCH format | First symbol | Number of symbols | Subchannel offset | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |

TABLE 3-continued mapping table for cyclic shift

| Index | PSFCH format | First symbol | Number of symbols | Subchannel offset | Set of initial CS indexes |
|---|---|---|---|---|---|
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

Cyclic Shift is Implicitly Related to the Other Parameters

1. Cyclic shift values are related to the distance-related information between TX and RX UE 108, and the distance-related information is contained in the SCI transmitted from the TX UE 106 to RX UE 108. The distance-related information may be SL RSRP obtained from the TX UE 106, GPS information of the TX/RX UE 108, zone ID of the TX UE 106 (by SCI reception), or the difference of zone IDs between the TX UE 106 and RX UE 108. It is noted that the relationship between zone and zone ID is predefined by technical standard documents. In one implementation, the cyclic shift value is the modulo of distance information to a predefined/configured constant (e.g., the maximum value of distance information). In some implementations, the cyclic shift is determined according to the distance information in addition to the RX UE 108 ID/destination ID. In other implementations, the cyclic shift is determined according to the destination ID in addition to the source ID.

2. It is noted that in case of utilizing RX location information, all possible cyclic shifts may need to be grouped into some predetermined subsets. Then, the RX UE 108 may select from predetermined subsets of CS based on RX-side information. Cyclic shift for the HARQ feedback of the PSSCH is related to the PSCCH resource containing the SCI that contains the scheduling information of the PSSCH. In one implementation, the cyclic shift value is the modulo of first CCE of the SCI to a predefined/configured constant (e.g., number of subcarriers according to resource block or the total number of cyclic shift indexes in the set of cyclic shift indexes). In some implementations, the cyclic shift value is the modulo of the first subchannel/physical resource block (PRB) of the SCI to a predefined/configured constant (e.g., number of subcarriers according to resource block or the total number of cyclic shift indexes in the set of cyclic shift indexes). In other implementations, cyclic shift for the HARQ feedback is contained in DCI format for SL/V2X/NR_V2X.

3. Cyclic shift for the HARQ feedback of the PSSCH is related to the PSSCH resource. In one implementation, the cyclic shift value is the modulo of the first subchannel/PRB of the PSSCH to a predefined/configured constant (e.g., number of subcarriers according to resource block or the total number of cyclic shift indexes in the set of cyclic shift indexes).

4. Cyclic shift for the HARQ feedback of the PSSCH is related to destination ID and/or source ID that is used for the PSSCH. It is noted that destination ID and/or source ID can be explicitly indicated in the SCI that contains the scheduling information of the PSSCH or contained in broadcast signaling.

Various implementations for abovementioned cyclic shift determination/indication are disclosed.

Implementation 1: Cyclic Shift is Explicitly Indicated in SCI

In a first action, the TX UE 106 and RX UE 108 have established unicast SL linkage. The TX UE 106 and RX UE 108 have received SIB signaling for PSFCH resource configuration as shown in Table 4. It is noted that two different PSFCH resource formats are configured in this resource pool.

TABLE 4

SIB signaling for NR V2X

```
SIB signaling ::{
SL-resourcepool::{
    .
    .
    .
    - PSFCH resource configuration
      - resource ID: #0
      - PSFCH format: 0
      - periodicity: 2 slots
      - slot offset:0 slot
      - frequency offset: 0 (subchannel)
      - frequency domain BW: 5 subchannels
    .
    .
    .
    - PSFCH resource configuration
      - resource ID: #1
      - PSFCH format: 0
      - periodicity: 4 slots
      - slot offset: 2 slots
      - frequency offset: 5 (subchannel)
      - frequency domain BW: 5 subchannels
    .
    .
    .
    }
}
```

Figure 6:
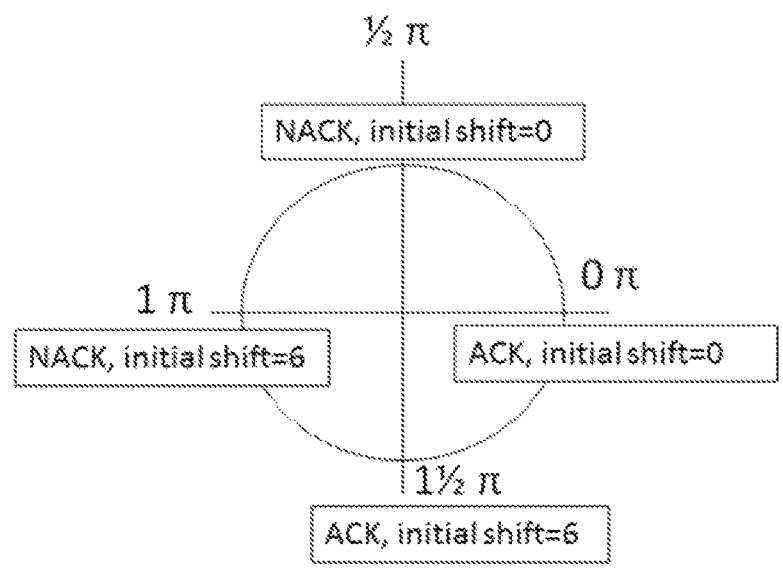
FIG. 6 is a schematic diagram illustrating dependence between initial cyclic shift and HARQ ACK/NACK, in accordance with example implementations of the present disclosure.
Figure 7:
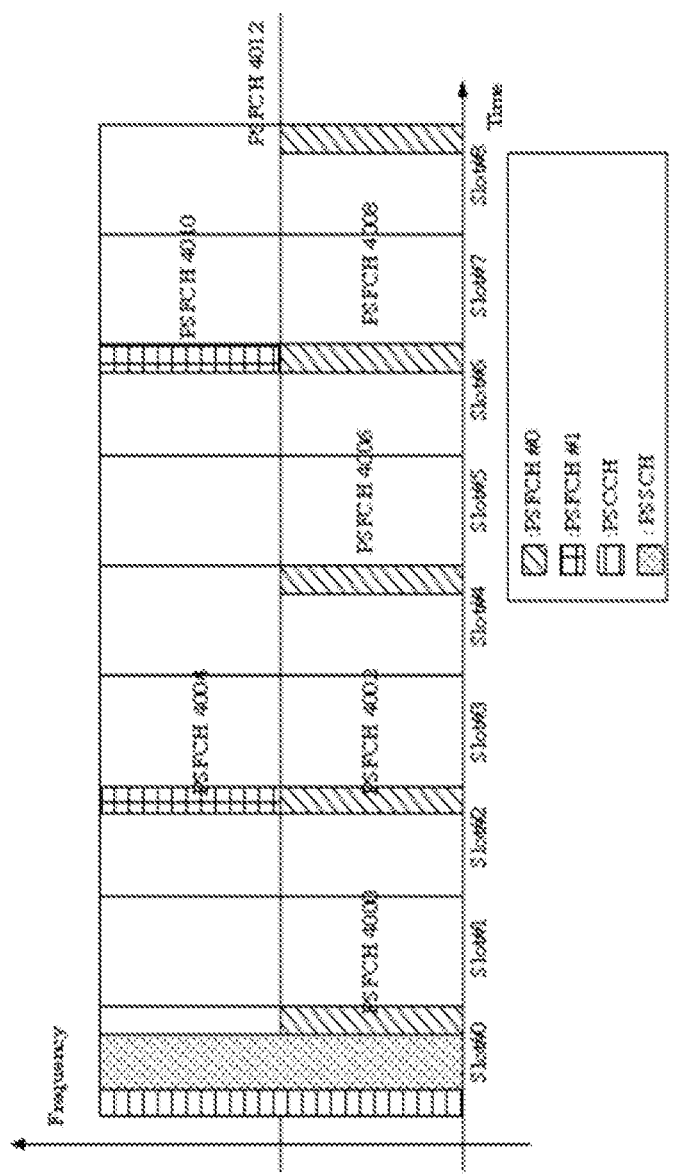
FIG. 7 is a schematic diagram illustrating PSFCH resource allocation within the resource pool, in accordance with example implementations of the present disclosure.

In a second action, as shown in FIG. 6 and FIG. 7, the RX UE 108 receives the PSCCH scheduled by first SCI from the TX UE 106 in slot #0. The SCI contains initial cyclic shift bitfield, where "0" indicates the initial cyclic shift is "0", and "1" indicates the initial cyclic shift is "6", and cyclic shift offset between "ACK" and "NACK" is fixed as "3", where cyclic shift offset may be calculated based on each phase shift point in cyclic shift list. Hence, the cyclic shifts correspond to ACK and NACK in this example are as shown in FIG. 6. The scheduling offset "K slots" between the last symbol of PSSCH to the first symbol of PSFCH is fixed as "4".

In a third action, since the RX UE 108 fails to receive and decode PSSCH transmitted in slot #0, the RX UE 108 may transmit NACK on the PSFCH resource 4006 with cyclic shift value equal to "½ π" as shown in FIG. 6 and FIG. 7.

In a fourth action, the UE 102 and UE 104 may monitor the PSFCH resource 4006 to determine whether the retransmission resource reserved by the TX UE 106 and RX UE 108 can be released. Since the RX UE 108 transmits NACK on the PSFCH resource 4006, which is located in the first slot equal to or larger than slot 0+K (i.e., K=4), the UE 102 and UE 104 may consider that the retransmission resource is reserved.

Implementation 2: Cyclic Shift is Explicitly Indicated in SCI with a Predefined Table In a first action, the TX UE 106 and RX UE 108 have established unicast SL linkage. The TX UE 106 and RX UE 108 have received SIB signaling for PSFCH resource configuration as shown in Table 5. It is noted that in this example, only one PSFCH resource format is configured in this resource pool. Moreover, Table 6 includes the mapping between PSFCH index contained in the SCI and the PSFCH resource configuration.

TABLE 5

SIB singling for NR V2X

SIB signaling ::{
SL-resourcepool::{
.
.
.
- PSFCH resource configuration
  - periodicity: 2 slots
  - slot offset:0 slot
  - frequency offset: 0 (subchannel)
  - frequency domain BW: 5 subchannels
.
.
.
}
}

TABLE 6

PSFCH resource index and PSFCH resource configuration

| Index | Starting symbol index | subchannel offset | Initial CS indexes |
|---|---|---|---|
| 0 | 10 | 6 | 0 |
| 1 | 10 | 0 | 4 |
| 2 | 10 | 6 | 8 |
| 3 | 10 | 0 | 0 |
| 4 | 10 | 0 | 6 |
| 5 | 10 | 6 | 9 |
| 6 | 12 | 6 | 3 |
| 7 | 12 | 0 | 6 |
| 8 | 12 | 0 | 9 |
| 9 | 12 | 0 | 0 |
| 10 | 12 | 6 | 0 |
| 11 | 14 | 0 | 6 |
| 12 | 14 | 0 | 3 |
| 13 | 14 | 6 | 0 |
| 14 | 14 | 6 | 3 |
| 15 | 14 | $\lfloor N_{BWP}^{size}/4 \rfloor$ | 6 |

Figure 8:
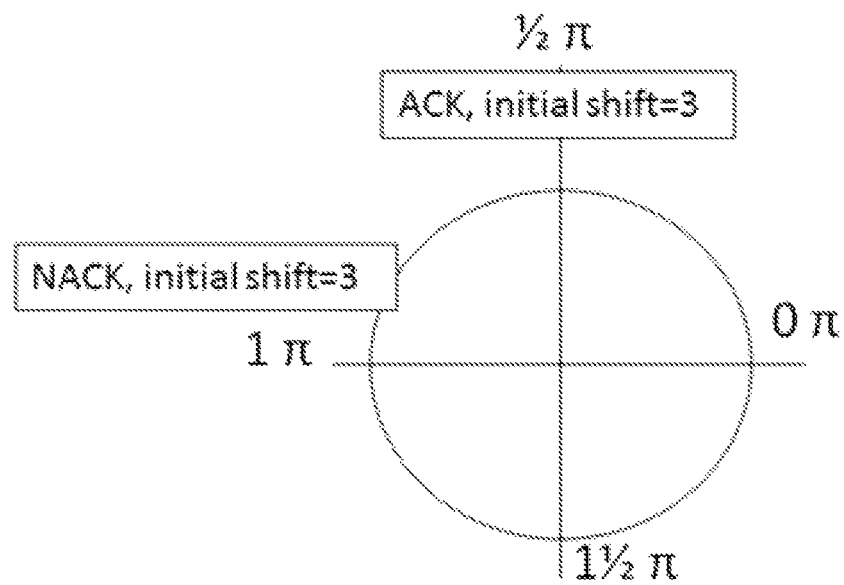
FIG. 8 is a schematic diagram illustrating dependence between initial cyclic shift and HARQ ACK/NACK, in accordance with example implementations of the present disclosure.
Figure 9:
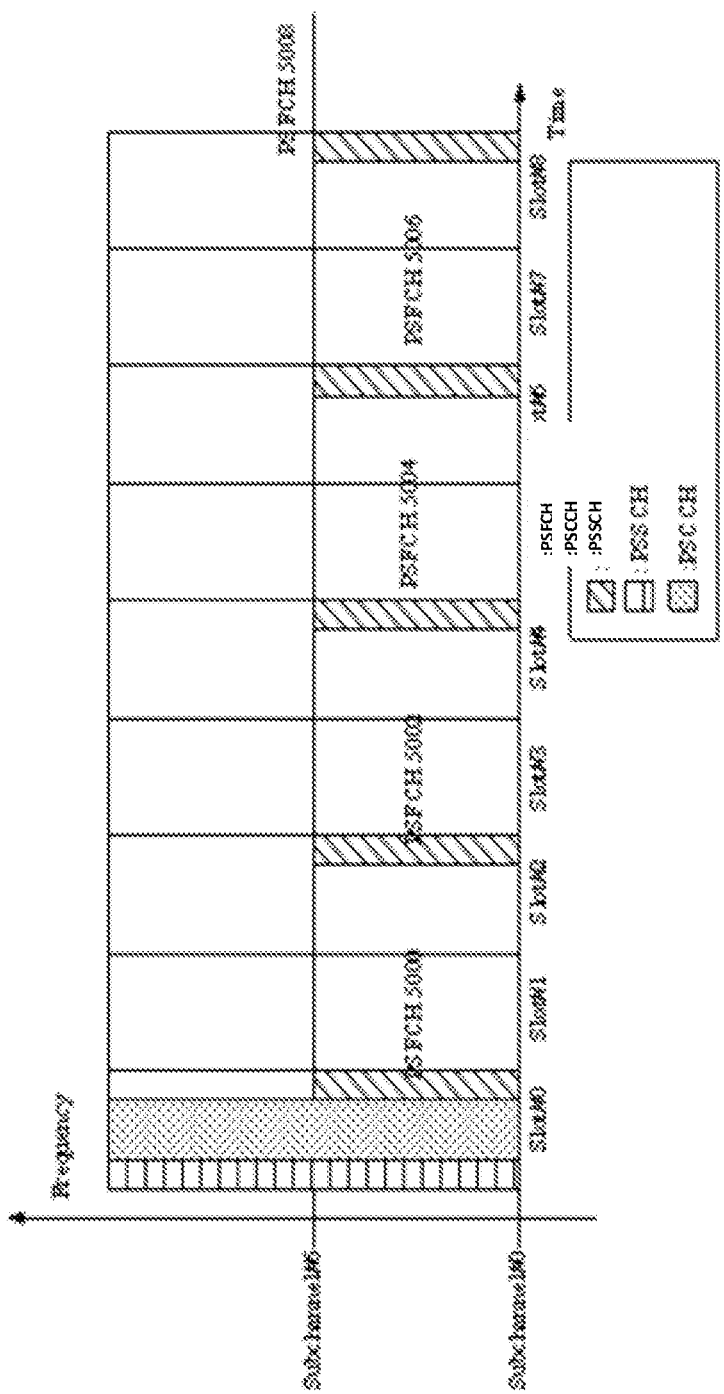
FIG. 9 is a schematic diagram illustrating PSFCH resource allocation within the resource pool, in accordance with example implementations of the present disclosure.

In a second action, as shown in FIG. 8 and FIG. 9, the RX UE 108 receives the PSSCH scheduled by the SCI from the TX UE 106 in slot #0. The SCI contains PSFCH resource index "1100", and cyclic shift offset between "ACK" and "NACK" is fixed as "3". Hence, the cyclic shifts correspond to ACK and NACK in this example are as shown in FIG. 8. The scheduling offset "K slots" between the last symbol of PSSCH to the first symbol of PSFCH is fixed as "4".

In a third action, since the RX UE 108 successfully receives and decode PSSCH transmitted in slot #0, the RX UE 108 may transmit ACK on the last symbol (i.e., starting symbol index is "12") with initial shift value "3" of the PSFCH resource 5004, which is located in the first slot equal to or larger than slot 0+K (e.g., K equals to 4), with cyclic shift value equal to "½ π" as shown in FIG. 8.

In a fourth action, the UE 102 and UE 104 may monitor the PSFCH resource 5004 to determine whether the retransmission resource reserved by the TX UE 106 and UE RX can be released. Since the RX UE 108 transmits ACK on the PSFCH resource 5004, the UE 102 and UE 104 may consider that the retransmission resource is released.

In this implementation, cyclic shift for HARQ feedback of the PSSCH is based on cyclic shift index of a predefined table.

Implementation 3: Cyclic Shift is Implicitly Indicated by Frequency Domain Resource of PSSCH In a first action, the TX UE 106 and RX UE 108 have established unicast SL linkage. The TX UE 106 and RX UE 108 have received SIB signaling for PSFCH resource configuration as shown in Table 7. It is noted that in this example only one PSFCH resource format is configured in this resource pool.

TABLE 7

SIB singling for NR V2X

SIB signaling ::{
SL-resourcepool::{
.
.
.
- PSFCH resource configuration
  - periodicity: 2 slots
  - slot offset:0 slot
  - frequency offset: 0 (subchannel)
  - frequency domain BW: 5 subchannels
  - initial cyclic shift set: {0, 3, 6, 9}
.
.
.
}
}

Figure 10:
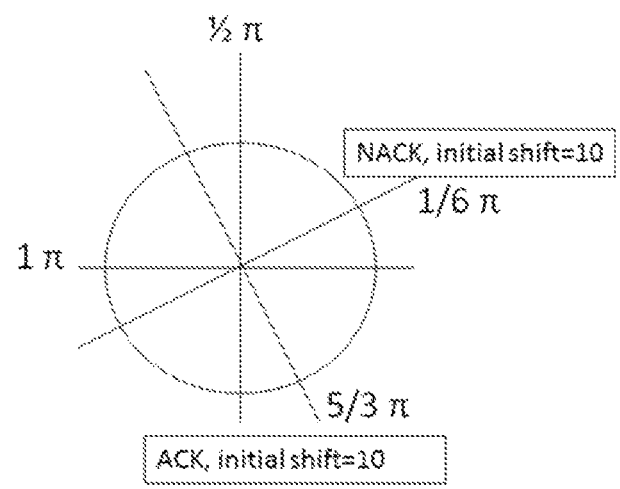
FIG. 10 is a schematic diagram illustrating dependence between initial cyclic shift and HARQ ACK/NACK, in accordance with example implementations of the present disclosure.
Figure 10:
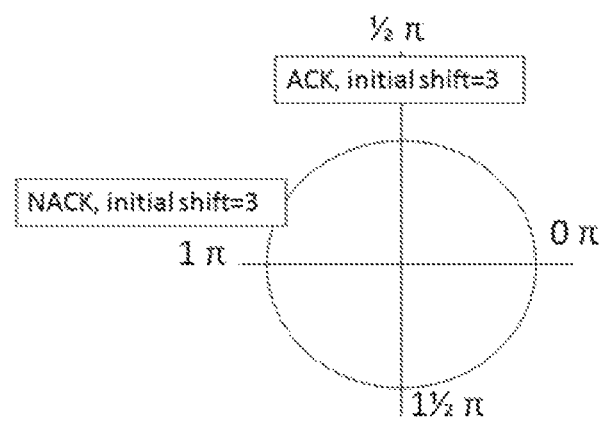

In a second action, the RX UE 108 receives the PSSCH schedule by the SCI from the TX UE 106 in slot #0. The SCI indicates the starting subchannel of PSSCH resource is "10", and, therefore, the initial cyclic shift of PSFCH for HARQ feedback of this PSSCH is "10 modulo 12", which is "10", and cyclic shift offset between "ACK" and "NACK" is fixed as "3". Hence, the cyclic shifts correspond to ACK and NACK in this example are as shown in FIG. 10. The scheduling offset "K slots" between the last symbol of PSSCH to the first symbol of PSFCH is fixed as "4".

In one example, the candidate initial cyclic shift is only {0,3,6,9} as configured in SIB signaling, and, therefore, the initial cyclic shift of PSFCH for HARQ feedback of PSSCH is "10 modulo 4", which is "2" and maps to the second value (i.e., "3") in the initial cyclic shift set.

In a third action, since the RX UE 108 may successfully receive and decode PSSCH transmitted in slot #0 and the RX UE 108 may transmit ACK on the PSFCH in slot #4 with cyclic shift value equal to "⅔ π".

In a fourth action, the UE 102 and UE 104 may monitor the PSFCH resource in slot #4 to determine whether the retransmission resource reserved by the TX UE 106 and RX UE 108 can be released. Since the RX UE 108 transmits ACK in slot #4, the UE 102 and UE 104 will consider that the retransmission resource is released.

In this implementation, cyclic shift for HARQ feedback of the PSCCH is determined by the frequency domain resource of the PSCCH (e.g., index of starting subchannel).

Implementation 4: Cyclic Shift is Implicitly Indicated by Destination ID

In a first action, the TX UE 106 and RX UE 108 have established unicast SL linkage. The TX UE 106 and RX UE 108 have received SIB signaling for PSFCH resource configuration as shown in Table 7.

In a second action, the RX UE 108 receives PSSCH scheduled by the SCI from the TX UE 106 in slot #0. The SCI contains the destination ID, which is "00000010", and the RX UE 108 may calculate initial cyclic shift according to the destination ID. The initial cyclic shift of PSFCH for HARQ feedback of this PSSCH is "00000010 modulo 12", which is "10", and cyclic shift offset between "ACK" and "NACK" is fixed as "3". Hence, the cyclic shifts corresponding to ACK and NACK in this implementation are as shown in FIG. 10. The scheduling offset "K slots" between the last symbol of PSSCH to the first symbol of PSFCH is fixed as "4".

In one example, the candidate initial cyclic shift is only {0,3,6,9} as configured in SIB signaling, and, therefore, the initial cyclic shift of PSFCH for HARQ feedback of PSSCH is "00000010 modulo 4", which maps to the second value (i.e., "3") in the initial cyclic shift set.

In a third action, since the RX UE 108 success to receive and decode PSSCH transmitted in slot #0 and the RX UE 108 may transmit ACK on the PSFCH in slot #4 with cyclic shift value equal to "$\frac{5}{3}\pi$".

In a fourth action, the UE 102 and UE 104 may monitor the PSFCH resource in slot #4 to determine whether the retransmission resource reserved by the TX UE 106 and the RX UE 108 can be released. Since the RX UE 108 transmits ACK in slot #4, the UE 102 and UE 104 may consider that the retransmission resource is released.

In this implementation, cyclic shift for HARQ feedback of the PSCCH is determined by destination ID of the RX UE 108.

Figure 11:
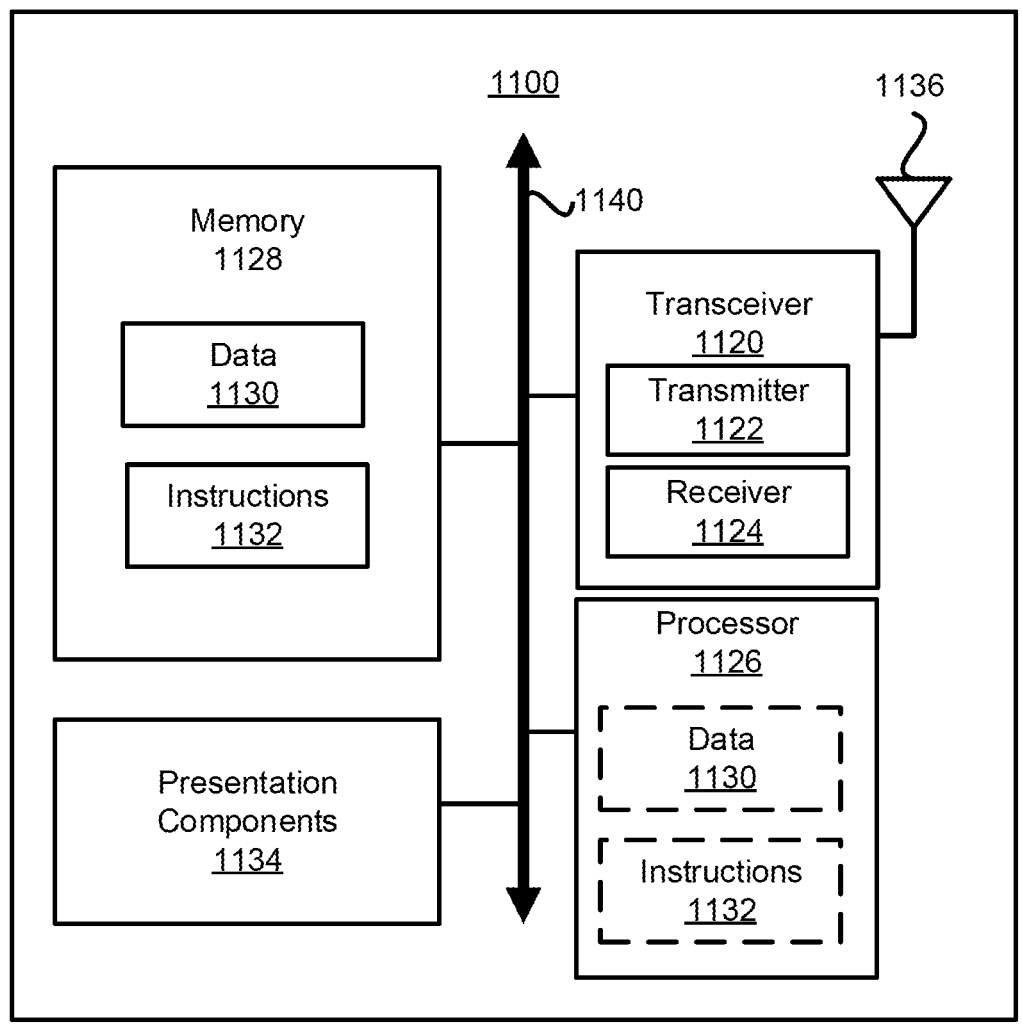
FIG. 11 is a block diagram illustrating a node for wireless communication, in accordance with example implementations of the present disclosure.

FIG. 11 illustrates a node 1100 for wireless communication according to the present disclosure.

As illustrated in FIG. 11, the node 1100 may include a transceiver 1120, a processor 1126, memory 1128, one or more presentation components 1134, and at least one antenna 1136. The node 1100 may also include a Radio Frequency (RF) spectrum band module, a BS communications module, a network communications module, a system communications management module, input/output (I/O) ports, I/O components, and a power supply (not shown). Each of these components may be in communication with each other, directly or indirectly, over one or more buses 1140. The node 1100 may be a UE that performs various disclosed functions as illustrated in FIG. 2.

The transceiver 1120 includes a transmitter 1122 (with transmitting circuitry) and a receiver 1124 (with receiving circuitry) and may be configured to transmit and/or receive time and/or frequency resource partitioning information. The transceiver 1120 may be configured to transmit in different types of subframes and slots including, but not limited to, usable, non-usable and flexibly usable subframes and slot formats. The transceiver 1120 may be configured to receive data and control channels.

The node 1100 may include a variety of computer-readable media. Computer-readable media may be any media that can be accessed by the node 1100 and include both volatile and non-volatile media, removable and non-removable media. Computer-readable media may include computer storage media and communication media. Computer storage media includes both volatile media and non-volatile media, as well as removable and non-removable media implemented in any method or technology for storage of information such as computer-readable instructions, data structures, program modules or other data.

Computer storage media includes Random Access Memory (RAM), Read-Only Memory (ROM), Electrically-Erasable Programmable Read-Only Memory (EEPROM), flash memory or other memory technology, Compact Disc Read-Only Memory (CD-ROM), digital versatile disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes wired media such as a wired network or direct-wired connection, and wireless media such as acoustic, radio frequency (RF), infrared and other wireless media. Combinations of any of the disclosed media should be included within the scope of computer-readable media.

The memory 1128 may include computer-storage media in the form of volatile and/or non-volatile memory. The memory 1128 may be removable, non-removable, or a combination thereof. Memory includes solid-state memory, hard drives, and optical-disc drives. As illustrated in FIG. 11, the memory 1128 may store computer-readable, computer-executable instructions 1132 (e.g., software codes) that are configured to cause the processor 1126 (e.g., processing circuitry) to perform various disclosed functions. Alternatively, the instructions 1132 may be configured to cause the node 1100 (e.g., when compiled and executed) to perform various disclosed functions.

The processor 1126 may include an intelligent hardware device (e.g., a central processing unit (CPU), a microcontroller, an Application Specific Integrated Circuit (ASIC), etc.). The processor 1126 may include memory. The processor 1126 may process the data 1130 and the instructions 1132 received from the memory 1128, and information received via the transceiver 1120, the baseband communications module, and/or the network communications module. The processor 1126 may also process information to be sent to the transceiver 1120 for transmission via the antenna 1136, to the network communications module for transmission to a CN.

The one or more presentation components 1134 present data to a person or other device. Presentation components 1134 include a display device, speaker, printing component, and vibrating component.

From the present disclosure, it is evident that various techniques can be utilized for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts. As such, the disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method for a first user equipment (UE) for determining one or more physical sidelink feedback channel (PSFCH) resources for hybrid automatic repeat request (HARQ) feedback, the method comprising:
receiving, from a second UE, first sidelink control information (SCI) for scheduling a first unicast physical sidelink shared channel (PSSCH) transmission, the first SCI associated with a source identifier (ID);
receiving, from the second UE, second SCI for scheduling a second unicast PSSCH transmission, the second SCI associated with the same source ID;

determining priorities of a first HARQ feedback corresponding to the first PSSCH transmission and a second HARQ feedback corresponding to the second PSSCH transmission according, respectively, to the first SCI and the second SCI; and transmitting, to the second UE, a PSFCH for at least one of the first HARQ feedback and the second HARQ feedback with a higher priority according to the determined priorities when a first PSFCH resource for the first HARQ feedback and a second PSFCH resource for the second HARQ feedback are at least partially overlapped in time domain, wherein transmitting the PSFCH comprises transmitting HARQ bits of both of the first and second HARQ feedbacks in the PSFCH when the PSFCH has enough resource size to include the HARQ bits of both of the first and second HARQ feedbacks in at least four slots after the first and second PSCCH transmissions.

2. The method of claim 1, further comprising:

dropping another one of the first HARQ feedback and the second HARQ feedback with a lower priority according to the determined priorities when the first PSFCH resource and the second PSFCH resource are at least partially overlapped in the time domain.

3. The method of claim 2, wherein dropping the another one of the first and second HARQ feedbacks with the lower priority comprises:

dropping a portion of HARQ bits of the another one of the first HARQ feedback and the second HARQ feedback with the lower priority when the PSFCH that is to be transmitted does not have enough resource size to include the HARQ bits of both of the first and second HARQ feedbacks.

4. The method of claim 1, further comprising:

dropping a PSSCH transmission, a physical sidelink control channel (PSCCH) transmission, or a PSFCH transmission on other resources when the PSFCH that is to be transmitted has enough size to include the HARQ bits of both of the first and second HARQ feedbacks in the at least four slots after the first and second PSSCH transmissions, but is at least partially overlapped with one of a PSSCH, a PSCCH, or a PSFCH of the other resources.

5. The method of claim 1, wherein transmitting the PSFCH for at least one of the first HARQ feedback and the second HARQ feedback with the higher priority comprises:

transmitting the PSFCH by overriding the first PSFCH resource with the second PSFCH resource when the first PSFCH resource and the second PSFCH resource are at least partially overlapped in the time domain, and the first PSSCH transmission is in a slot prior to a slot of the second PSFCH resource, wherein the first PSSCH transmission is prior to the second PSSCH transmission.

6. The method of claim 1, wherein the transmitted PSFCH is selected according to the first and second PSFCH resources located on a subchannel with a lowest index, a subchannel with a smaller capacity for including sidelink feedback control information (SFCI), or a subchannel starting at earlier symbol of a slot.

7. The method of claim 1, wherein transmitting the PSFCH for at least one of the first HARQ feedback and the second HARQ feedback with the higher priority comprises:

determining whether to transmit the PSFCH for at least one of the first HARQ feedback and the second HARQ feedback according to a PSFCH resource configuration indicated by one of master information block (MIB)-sidelink (SL), system information block (SIB), SIB-SL, radio resource control (RRC), SL-RRC, according to resource pool, bandwidth part (BWP), and anchor carrier; or determining whether to transmit the PSFCH for at least one of the first HARQ feedback and the second HARQ feedback according to service types of the first and second PSSCH transmissions, wherein the service types are differentiated by at least one of a logical channel (LCH), a logical channel group identifier (LCG ID) of a transport block (TB)/data in a medium access control (MAC) configuration, and a priority indicator either in the first or second SCI.

8. A user equipment (UE) for determining one or more physical sidelink feedback channel (PSFCH) resources for hybrid automatic repeat request (HARQ) feedback, the UE comprising:

at least one processor for executing computer-executable instructions; and at least one non-transitory machine-readable medium, coupled to the processor, for storing the computer-executable instructions, wherein the computer-executable instructions when executed by the at least one processor instruct the UE to:

receive, from a second UE, first sidelink control information (SCI) for scheduling a first unicast physical sidelink shared channel (PSSCH) transmission, the first SCI associated with a source identifier (ID);

receive, from the second UE, second SCI for scheduling a second unicast PSSCH transmission, the second SCI associated with the same source ID;

determine priorities of a first HARQ feedback corresponding to the first PSSCH transmission and a second HARQ feedback corresponding to the second PSSCH transmission according, respectively, to the first SCI and the second SCI; and transmit, to the second UE, a PSFCH for at least one of the first HARQ feedback and the second HARQ feedback with a higher priority according to the determined priorities when a first PSFCH resource for the first HARQ feedback and a second PSFCH resource for the second HARQ feedback are at least partially overlapped in time domain, wherein transmitting the PSFCH comprises transmitting HARQ bits of both of the first and second HARQ feedbacks in the PSFCH when the PSFCH has enough resource size to include the HARQ bits of both of the first and second HARQ feedbacks in at least four slots after the first and second PSCCH transmissions.

9. The UE of claim 8, wherein the computer-executable instructions when executed by the at least one processor further instruct the at least one processor to:

drop another one of the first HARQ feedback and the second HARQ feedback with a lower priority according to the determined priorities when the first PSFCH resource and the second PSFCH resource are at least partially overlapped in the time domain.

10. The UE of claim 9, wherein dropping the another one of the first and second HARQ feedbacks with the lower priority comprises:

dropping a portion of HARQ bits of the another one of the first HARQ feedback and the second HARQ feedback with the lower priority when the PSFCH that is to be transmitted does not have enough resource size to include the HARQ bits of both of the first and second HARQ feedbacks.

11. The UE of claim 8, wherein the computer-executable instructions when executed by the at least one processor further instruct the at least one processor to:
drop a PSSCH transmission, a physical sidelink control channel (PSCCH) transmission/reception, or a PSFCH transmission on other resources when the PSFCH that is to be transmitted has enough size to include the HARQ bits of both of the first and second HARQ feedbacks in the at least four slots after the first and second PSSCH transmissions, but is at least partially overlapped with one of a PSSCH, a PSCCH or a PSFCH of the other resources.

12. The UE of claim 8, wherein transmitting the PSFCH for at least one of the first HARQ feedback and the second HARQ feedback with the higher priority comprises:
transmitting the PSFCH by overriding the first PSFCH resource with the second PSFCH resource when the first PSFCH resource and the second PSFCH resource are overlapped in the time domain, and the first PSSCH transmission is in a slot prior to a slot of the second PSFCH resource, wherein the first PSSCH transmission is prior to the second PSSCH transmission.

13. The UE of claim 8, wherein the computer-executable instructions when executed by the at least one processor further instruct the at least one processor to:
select the transmitted PSFCH according to the first and second PSFCH resources located on a subchannel with a lowest index, a sub channel with a smaller capacity for including sidelink feedback control information (SFCI), or a subchannel starting at earlier symbol of a slot.

14. The UE of claim 8, wherein transmitting the PSFCH for at least one of the first HARQ feedback and the second HARQ feedback with the higher priority comprises:
determine whether to transmit the PSFCH for at least one of the first HARQ feedback and the second HARQ feedback according to a PSFCH resource configuration indicated by one of master information block (MIB)-sidelink (SL), system information block (SIB), SIB-SL, radio resource control (RRC), SL-RRC according to resource pool, bandwidth part (BWP) and anchor carrier; or
determine whether to transmit the PSFCH for at least one of the first HARQ feedback and the second HARQ feedback according to service types of the first and second PSSCH transmissions, wherein the service types are differentiated by at least one of a logical channel (LCH), a logical channel group identifier (LCG ID) of a transport block (TB)/data in a medium access control (MAC) configuration, and a priority indicator in either the first or second SCI.

* * * * *